United States Patent [19]
Ichinowatari

[11] Patent Number: 6,124,942
[45] Date of Patent: *Sep. 26, 2000

[54] METHOD OF AVOIDING UNNECESSARY FACSIMILE TRANSMISSION DELAYS, AND FACSIMILE MACHINE EMPLOYING THIS METHOD

[75] Inventor: Yasuo Ichinowatari, Tokyo, Japan

[73] Assignee: Oki Data Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/959,825

[22] Filed: Oct. 29, 1997

[30] Foreign Application Priority Data

Nov. 11, 1996 [JP] Japan ................................ 8-298554

[51] Int. Cl.⁷ ...................................................... H04N 1/00
[52] U.S. Cl. ............................................. 358/1.17; 358/404
[58] Field of Search .................................... 358/404, 444, 358/434, 436, 437, 441, 468, 1.9, 1.2, 1.11, 1.13, 1.6, 1.14, 1.16, 1.17

[56] References Cited

U.S. PATENT DOCUMENTS

| | | |
|---|---|---|
| 5,208,681 | 5/1993 | Yoshida .................................... 358/404 |
| 5,220,438 | 6/1993 | Yamamoto ................................ 358/404 |
| 5,319,648 | 6/1994 | Bux et al. ................................. 371/32 |
| 5,375,422 | 10/1997 | Hara et al. ............................... 358/404 |
| 5,479,587 | 12/1995 | Campbell et al. ........................ 395/114 |
| 5,483,622 | 1/1996 | Zimmerman et al. .................... 395/115 |
| 5,585,941 | 12/1996 | Maemura ................................. 358/444 |
| 5,654,804 | 8/1997 | Hattori .................................... 358/404 |
| 5,812,279 | 9/1998 | Fukushima et al. ..................... 358/404 |
| 5,812,283 | 9/1998 | Tachibana et al. ...................... 358/404 |

FOREIGN PATENT DOCUMENTS 09037049  2/1997  Japan.

*Primary Examiner*—Madeleine Nguyen
*Attorney, Agent, or Firm*—Akin, Gump, Strauss, Hauer & Feld, L.L.P.

[57] ABSTRACT

A facsimile machine has a buffer memory that stores pages of data awaiting printing, and a control unit that controls the receiving of new pages from a distant transmitting station. After each page of data is received, the control unit determines how much free space is available in the buffer memory, determines how many unprinted pages are stored in the buffer memory, and decides from both of these quantities whether a new page of data can be received.

7 Claims, 3 Drawing Sheets

METHOD OF AVOIDING UNNECESSARY FACSIMILE TRANSMISSION DELAYS, AND FACSIMILE MACHINE EMPLOYING THIS METHOD

BACKGROUND OF THE INVENTION

The present invention relates to a facsimile machine, more particularly to a method employed by the facsimile machine to decide when a new page of data can be received.

A facsimile machine receives compressively encoded facsimile data, decodes and thereby expands the received data, and prints the expanded data. The encoded and decoded data, and other image data, are stored in a buffer memory, the encoded data awaiting decoding, the decoded data awaiting printing, and other data awaiting transmission. The printing of a page does not begin until all coded data for the page have been received.

Since coded data can be received faster than the corresponding pages can be printed, unprinted pages may accumulate in the buffer memory. If the buffer memory overflows during the reception of a page, data are lost and the page must to be transmitted again. Even without an overflow, if the amount of free space in the buffer memory becomes too small to store expanded data, printing will become impossible. To avoid these difficulties, a conventional facsimile machine keeps count of the number of unprinted pages stored in the buffer memory, and allows transmission of a new page to begin only if the number of unprinted pages currently stored is below a fixed limit.

One problem with this scheme is that the amount of coded data per page is variable, and the amount of other data stored in the buffer memory is highly variable. Therefore, even when the number of stored pages equals or exceeds the fixed limit, there may still be sufficient space to receive more pages. Refusing to receive in this situation needlessly delays the facsimile transmission.

SUMMARY OF THE INVENTION

It is accordingly an object of the present invention to avoid unnecessary facsimile transmission delays.

The invented facsimile machine has a buffer memory that stores pages of data awaiting printing, and a control unit that controls the receiving of new pages from a distant transmitting station. After each page of data is received, the control unit determines how much free space is available in the buffer memory, and determines how many unprinted pages are stored in the buffer memory. Taking both of these values into account, the control unit decides whether a new page can be received, and delays reception of the next page, by sending a message to the transmitting station, when a new page cannot be received.

DETAILED DESCRIPTION OF THE INVENTION

A facsimile machine embodying the invention will be described with reference to the attached illustrative drawings.

Figure 1:
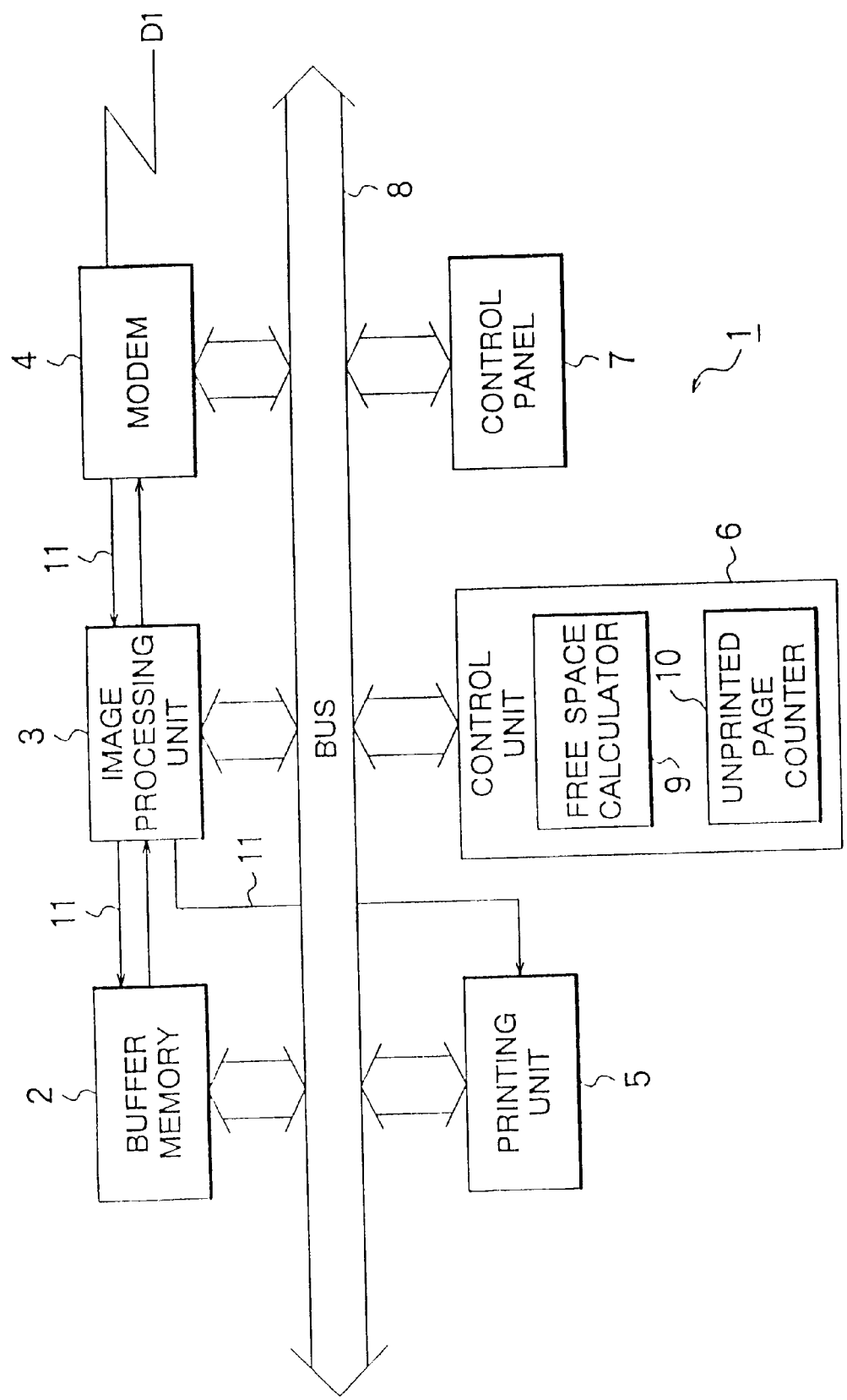
FIG. 1 is a block diagram of an embodiment of the invented facsimile machine.

Referring to FIG. 1, this facsimile machine 1 comprises a buffer memory 2, an image processing unit 3, a modulator-demodulator or modem 4, a printing unit 5, a control unit 6, a control panel 7, and a data bus 8. The control unit 6 has a free space calculator 9 and an unprinted page counter 10. The control unit 6 is, for example, a microcontroller, the free space calculator 9 and unprinted page counter 10 being part of the microcontroller's software. The image processing unit 3 is linked to the buffer memory 2, modem 4, and printing unit 5 by various image data signal lines 11.

The basic functions of these elements are as follows.

The modem 4 receives coded facsimile image data D1 transmitted from a distant facsimile machine via a transmission line. The image processing unit 3 stores the coded image data in the buffer memory 2, decodes the coded data, and temporarily stores the resulting expanded data in the buffer memory 2. The printing unit 5 prints the expanded data. The control unit 6 receives manual input from the control panel 7, controls the overall operation of the other units, and sends signals to the distant facsimile machine via the modem 4. The data bus 8 transports control and status information among the other units.

It will be assumed below that the buffer memory 2 has a capacity of two hundred fifty-six kilobytes (256 kbytes).

In the control unit 6, the free space calculator 9 calculates the number of kilobytes of free space available in the buffer memory 2. Free space is space containing no data, or containing data that are no longer needed and can be overwritten, such as data for pages that have already been printed. The unprinted page counter 10 keeps track of the number of unprinted pages stored in the buffer memory 2. The unprinted page counter 10 functions as an up-down counter, incrementing an unprinted page count value when each new page is received, and decrementing the same count value when each page is printed. The count value may be stored, for example, in an internal register in the control unit 6.

Next, the operation of the invented facsimile machine in receiving data will be described. The description will be based on the assumptions that the printing unit 5 prints on A4-size paper at a maximum rate of four pages per minute, that the modem 4 receives data at a rate of 14.4 kilobits per second, that the amount of data received is substantially 10 kbytes per page, and that the buffer memory 2 already holds 128 kbytes of other image data, such as image data for pages waiting to be transmitted to another facsimile machine.

Figure 2:
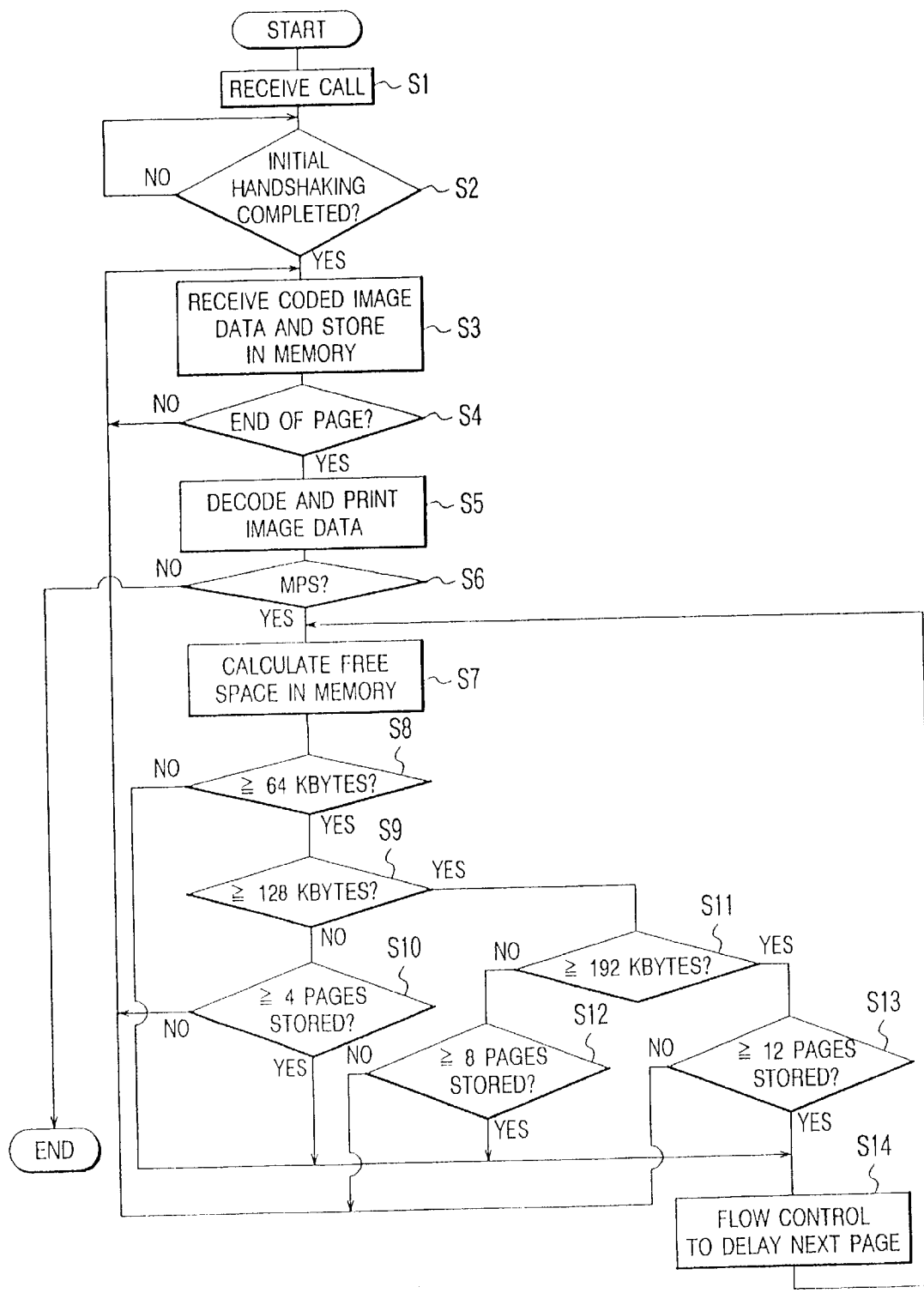
FIG. 2 is a flowchart describing the operation of the embodiment.

Referring to FIG. 2, in step S1, a facsimile call is received and the distant facsimile machine begins transmitting modulated data D1 to the modem 4. The first data to be sent constitute an initial handshaking sequence by which the two facsimile machines establish mutually compatible communication parameters. The modem 4 passes the handshaking data to the control unit 6 as necessary and, in step S2, waits for the handshaking sequence to end. When the handshaking sequence ends and the transmission of coded image data begins, the coded image data are received and stored in the buffer memory 2 in step S3

In step S4, the control unit 6 waits for the end of one page of data. When one page has been received, the unprinted page counter 10 increments the unprinted page count, from zero to one for the first page, and the control unit 6 proceeds to step S5. In step S5, the image processing unit 3 starts decoding the received data, and sends the decoded data to the printing unit 5, which prints the decoded data as a received image.

At the end of each page, in accordance with the T.30 standard established by the International Telecommunication Union (ITU), the distant facsimile machine sends either an end-of-procedure (EOP) signal or a multi-page signal (MPS). In step S6, the control unit 6 determines which of these two signals has been received, and takes appropriate action. The EOP signal means that the distant facsimile machine has no more pages to send, so if this signal is received, the control unit 6 ends the receiving procedure. The MPS signal means that the distant facsimile machine has further pages to send, so if this signal is received, the control unit 6 proceeds to step S7.

In step S7, the free space calculator 9 calculates the amount of free space in the buffer memory 2. In the present case, the capacity of the buffer memory 2 is 256 kbytes, but 128 kbytes were already occupied by other data, and another 10 kbytes have just been received, so the free space calculator 9 determines that there are 118 kbytes of free space, as follows.

$$256-128-10=118[\text{kbytes}]$$

In step S8, the control unit 6 decides whether the amount of free space is at least 64 kbytes. In the present case, the result if this decision is 'yes,' and the control unit 6 proceeds to step S9. If a 'no' result were obtained, the control unit 6 would proceed to step S14, described below.

In step S9, the control unit 6 decides whether the amount of free space is at least 128 kbytes. In the present case, this result of this decision is 'no,' and the control unit 6 proceeds to step S10. If a 'yes' result were obtained, the control unit 6 would proceed to step S1, described below.

In step S10, the control unit 6 decides whether the number of unprinted pages stored in the buffer memory 2 is four or more. In the present case, at the end of reception of the first page, the unprinted page count stands at one page, so the decision result is 'no' and the control unit 6 returns to step S3 to receive the next page of coded data.

If a 'yes' result is obtained in step S9, then in step S1, the control unit 6 decides whether the buffer memory 2 has at least 192 kbytes of free space. If less than 192 kbytes are free, then in step S12, the control unit 6 decides whether the number of unprinted pages is eight or more. If at least 192 kbytes are free, then in step S13, the control unit 6 decides whether the number of unprinted pages is twelve or more. A 'no' result in step S12 or step S13 sends the control unit 6 back to step S3 to receive the next page, while a 'yes' result sends the control unit 6 on to step S14.

Steps S8 to S13 constitute a procedure that compares the unprinted page count with a threshold value of zero, four, eight, or twelve, depending on the amount of free space. The unprinted page threshold increases in increments of four pages as the amount of free space increases in increments 64 kbytes.

Steps S8 to S13 could also be described as a procedure that compares the free space with a threshold value that varies depending on the number of stored unprinted pages, the free-space threshold increasing in increments of 64 kbytes as the number of pages increases in increments of four pages. The two descriptions are equivalent.

A 'yes' result in step S10, S12, or S13, or a 'no' result in step S8, indicates that in view of the number of unprinted pages currently stored, the buffer memory 2 does not have enough free space to receive a new page safely. The control unit 6 accordingly proceeds, in step S14, to carry out flow control to delay the reception of the next page. Step S14 is followed by a return to step S7 to test the free-space value and unprinted page count again.

Figure 3:
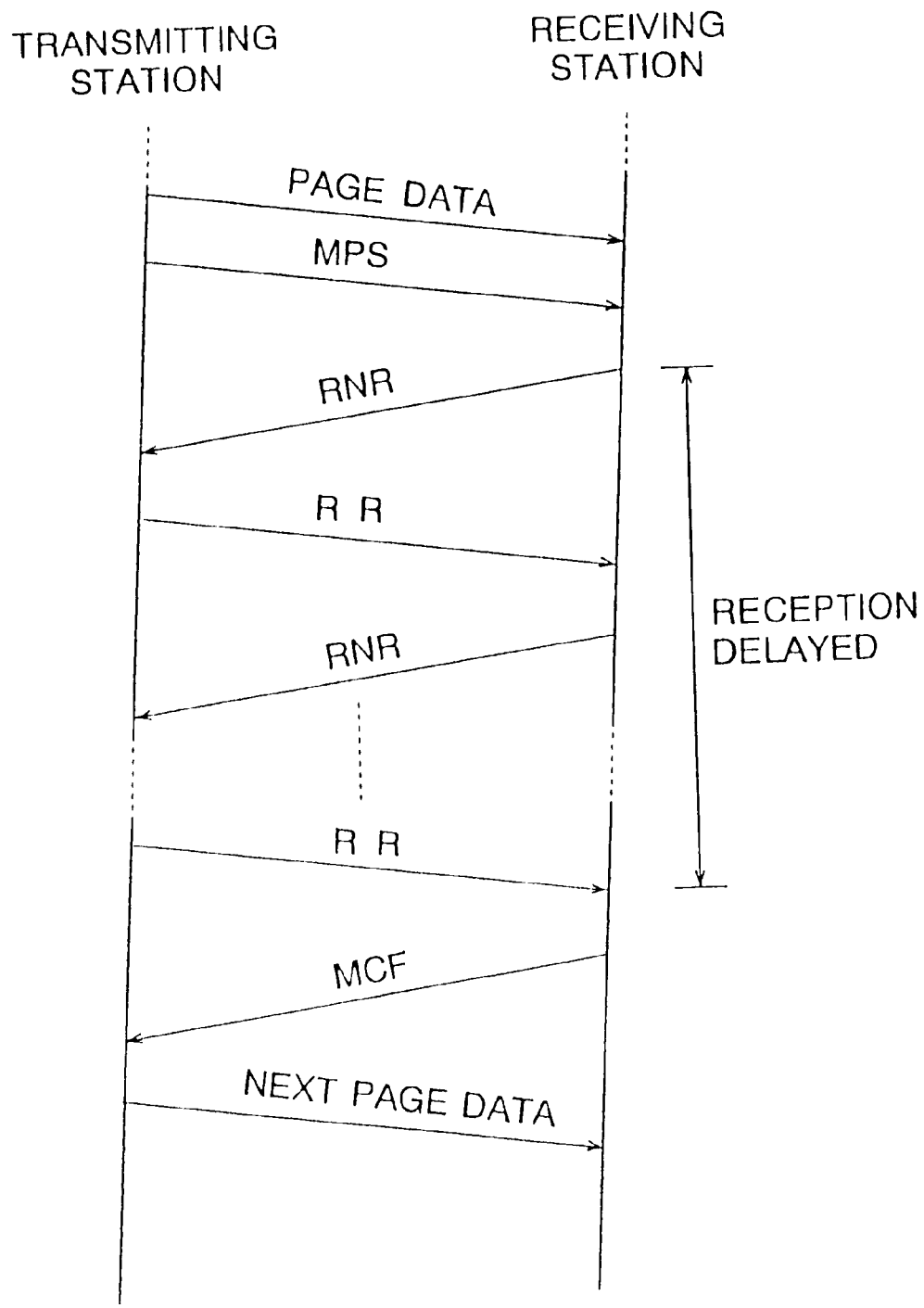
FIG. 3 is a protocol diagram illustrating flow control.

The flow control protocol, which conforms to the above-mentioned T.30 standard, is illustrated in FIG. 3. At the top of this diagram, the distant facsimile machine or transmitting station sends a page of data, then sends an MPS message indicating that there is another page to be sent. If the receiving facsimile machine or receiving station wishes to delay reception of the next page, i.e. if the control unit 6 is executing step S14, the control unit 6 sends a receive-not-ready (RNR) message via the modem 4 to the distant facsimile machine.

The distant facsimile machine next sends a receive-ready (RR) message to inquire about the status of the receiving facsimile machine. If the control unit 6 still finds, upon repeating the decision process starting in step S7, that the buffer memory 2 does not have enough free space, another RNR reply is sent back. This exchange of RR and RNR messages may continue an arbitrary number of times.

As data in the buffer memory 2 are printed, however, the amount of free space increases while the unprinted page count is reduced. Eventually the control unit 6 will obtain a 'yes' result in step S8 and a 'no' result in step S10, S12, or S13, and will return to step S3. At this point, the control unit 6 sends a message confirmation (MCF) in reply to the distant facsimile machine's RR inquiry, as shown at the bottom of FIG. 3. The distant facsimile machine then begins transmitting the next page.

Given that the buffer memory 2 holds 128 kbytes of image data awaiting transmission, the scheme in FIG. 2 allows four pages to be received before any pages are printed at all. At 14.4 kilobits per second, however, it takes about ten seconds to receive the coded image data and associated handshaking data for one page. During the approximately forty seconds while four pages are being received, one or possibly two pages will have been printed, so the number of stored unprinted pages will be less than four, and a fifth page can be received without delay. Normally, if printing proceeds at maximum speed, about ten pages can be received without delay before a 'yes' result in step S10 causes the control unit 6 to execute step S14.

If the buffer memory 2 holds only 64 kbytes of data awaiting transmission, then eight pages can be received before any pages are printed at all, and if printing proceeds normally during data reception, it should be possible to receive over twenty pages without delay.

If the buffer memory 2 holds no data awaiting transmission, the corresponding figures are twelve pages receivable before printing begins, and over thirty pages receivable without delay if printing proceeds normally during data reception.

By allowing different numbers of unprinted pages to be stored, depending on the amount of free space in the buffer memory 2, the control unit 6 can avoid needlessly refusing to receive new pages, and still leave sufficient free space for the stored, unprinted pages to be expanded and printed. While preventing the problems of memory overflow and inadequate memory space for expanding and printing unprinted pages, the invented facsimile machine shortens facsimile transmission times by avoiding unnecessary delays.

The figures given above for the data transmission rate, page data size, page printing time, and memory capacity are of course only examples. The invention is not restricted to these values.

Similarly, the invention is not restricted to the free-space threshold values of 64 kbytes, 128 kbytes, and 192 kbytes used in steps S8, S9, and S11, or the unprinted-page threshold values of four, eight, and twelve pages used in steps S10, S12, and S13. More closely-spaced threshold values can be employed to better avoid unnecessary delays. Alternatively, continuously varying thresholds can be used: the unprinted-page threshold value can be calculated from the free-space value by a mathematical formula; or the free-space threshold value can be calculated from the number of stored unprinted pages by a mathematical formula; or a quantity calculated from both the free-space value and the unprinted page count can be compared with a fixed threshold value.

Those skilled in the art will recognize that further variations are possible within the scope claimed below.

What is claimed is:

1. A facsimile machine that receives and prints pages of data one at a time, the pages of data being transmitted from a distant facsimile machine in a call between the facsimile machine and the distant facsimile machine, comprising:

a buffer memory for storing pages of data awaiting printing; and a control unit for determining how much free space is available in said buffer memory, determining how many unprinted pages of data are stored in said buffer memory, deciding whether a new page of data can be received by considering both the free space currently available in said buffer memory and further free space that will become available as the unprinted pages of data currently stored in said buffer memory are printed during data reception, and delaying reception of said new page of data if said new page of data cannot be received, by sending a signal to said distant facsimile machine, according to a standard facsimile protocol causing said distant facsimile machine to temporarily stop transmitting said data, without terminating said call.

2. The facsimile machine of claim 1, further comprising an image processing unit that expands the pages of data stored in said buffer memory and stores resulting expanded page data in said buffer memory, said pages of data being printed by printing the expanded page data.

3. The facsimile machine of claim 1, wherein said control unit has an unprinted page counter that increments a count value when a page of data is received, and decrements said count value when a stored page of data is printed.

4. The facsimile machine of claim 3, wherein said control unit compares said count value with a threshold value that is based on the free space determined to be available in said buffer memory, but varies depending on said further free space that will become available.

5. The facsimile machine of claim 4, wherein said threshold value allows sufficient space for expanding and printing of said unprinted pages of data.

6. A method of controlling the reception of data from a first facsimile machine by a second facsimile machine having a buffer memory in which received data are stored awaiting printing, in a call between the first facsimile machine and the second facsimile machine, comprising the steps of:

(a) determining how many unprinted pages of data are stored in the buffer memory;

(b) determining how much free space is available in the buffer memory;

(c) receiving a page of data from the first facsimile machine if less than a threshold number of unprinted pages are stored in the buffer memory, said threshold number being based on the free space determined to be available but varying depending on further free space that will become available as said unprinted pages of data currently stored in said buffer memory are printed;

(d) delaying reception of said page of data if at least said threshold number of unprinted pages are stored in the buffer memory, by sending a signal to the first facsimile machine, according to a standard facsimile protocol, causing the first facsimile machine to temporarily stop transmitting said data, without terminating said call; and (e) repeating said steps (a), (b), (c), and (d).

7. The method of claim 6, wherein said threshold number of unprinted pages increases in increments of a first size as said free space increases in increments of a second size, said first size representing a number of pages printable during reception of data into an area of said second size in said buffer memory.

* * * * *